United States Patent
Osborn

(10) Patent No.: US 6,861,633 B2
(45) Date of Patent: Mar. 1, 2005

(54) MICROELECTROMECHANICAL SYSTEM OPTICAL SENSOR PROVIDING BIT IMAGE DATA OF A VIEWED IMAGE

(75) Inventor: Jon V. Osborn, Thousand Oaks, CA (US)

(73) Assignee: The Aerospace Corporation, El Segundo, CA (US)

(*) Notice: Subject to any disclaimer, the term of this patent is extended or adjusted under 35 U.S.C. 154(b) by 374 days.

(21) Appl. No.: 10/177,165

(22) Filed: Jun. 20, 2002

(65) Prior Publication Data

US 2003/0234341 A1 Dec. 25, 2003

(51) Int. Cl.⁷ .............................................. H01L 31/052
(52) U.S. Cl. ................. 250/208.1; 250/203.3; 250/203.4; 136/243
(58) Field of Search ................ 250/203.3, 203.4, 250/208.1; 126/573; 136/243, 246, 252, 292; 342/357.06, 357.12, 357.16; 701/213, 214, 226, 13, 14

(56) References Cited

U.S. PATENT DOCUMENTS 6,639,733 B2 * 10/2003 Minano et al. ............. 359/728
6,700,055 B2 * 3/2004 Barone ...................... 136/246

* cited by examiner

*Primary Examiner*—Stephone B. Allen
(74) *Attorney, Agent, or Firm*—Derrick Michael Reid

(57) ABSTRACT

An integrated microelectromechanical system (MEMS) sun sensor includes a filter, microlens, aperture and a folded MEMS optical element combined with an active pixel sensor array to form an integrated spacecraft sun sensor in an integrated sealed package, offering lower power, smaller size and higher performance for use on spinning spacecraft useful in attitude determinations. Multiple like sun sensors can be disposed for increasing the reliability, spatial coverage or spatial resolution for a specific performance requirement.

17 Claims, 3 Drawing Sheets

SUN SENSOR TOP VIEW

SUN SENSOR SIDE VIEW

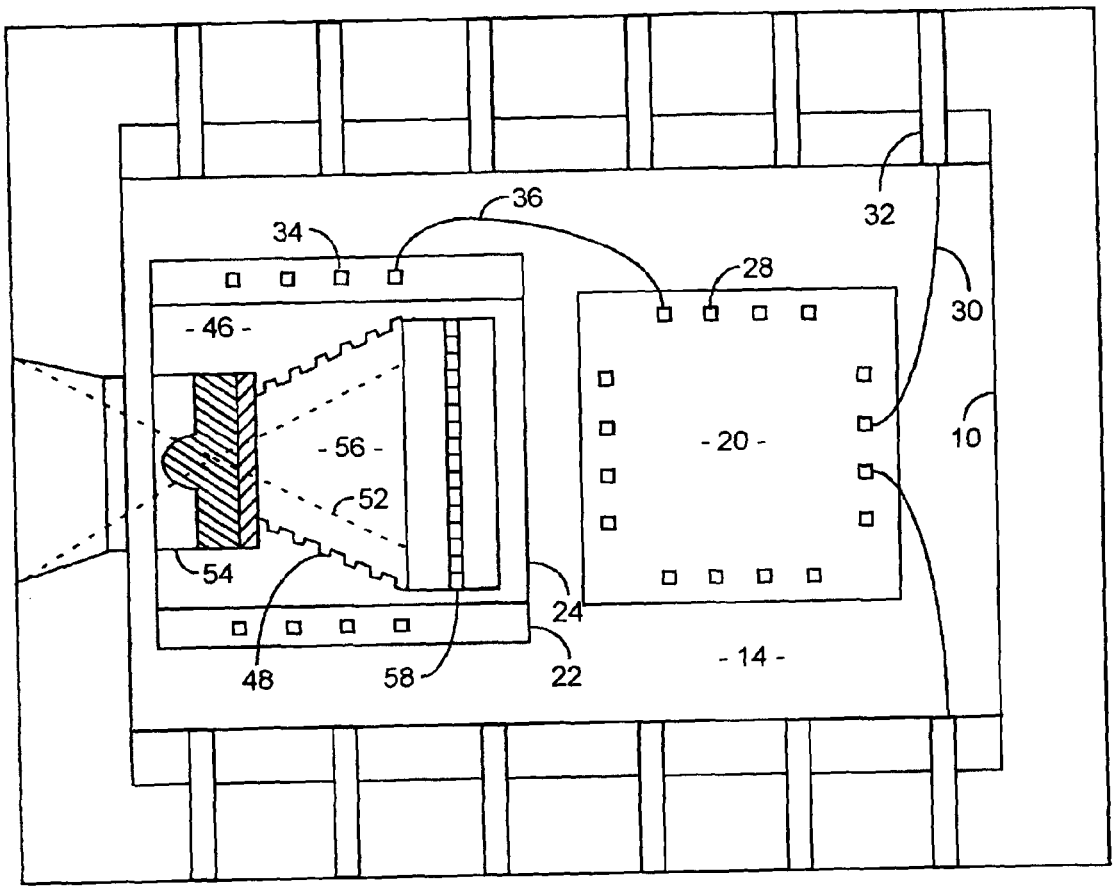
FIG. 1A  SUN SENSOR TOP VIEW
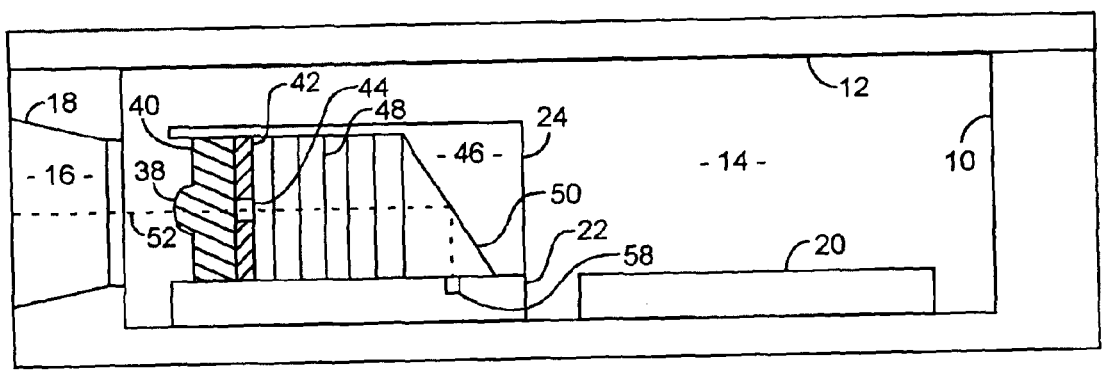
FIG. 1B  SUN SENSOR SIDE VIEW

ACTIVE PIXEL READOUT CHANNEL

ACTIVE PIXEL READOUT CHIP

SUN SENSOR DATA PROCESSOR

MICROELECTROMECHANICAL SYSTEM OPTICAL SENSOR PROVIDING BIT IMAGE DATA OF A VIEWED IMAGE

FIELD OF THE INVENTION

The invention relates to the fields of optics and semiconductors. More particularly, the present invention relates to optical microlens sun sensors for sensing solar light.

BACKGROUND OF THE INVENTION

Advanced space missions using nanosatellite constellations are hindered by a lack of miniaturized low power attitude determination and control systems. Replacing large conventional spacecraft attitude sensors with smaller low power sun sensors is desirable for both three axis stabilized spacecraft and spinning spacecraft. A three axis stabilized spacecraft may have a centroid sun sensor having a central detector pointing at the sun with a series of circumferentially disposed detectors surrounding the central detector for determining when the sun is off center of a pointing line of sight when pointing directly towards the sun. An optical lens is used to focus the received sun light onto the central detector. A spinning spacecraft uses a scanning sun sensor that necessary scans a field of view for determining when the sun is in-view by creating an intensity profile where the maximum intensity points to the sun along a line of sight for determining the location of the sun and relating the location of the sun to the spin phase of the spacecraft for attitude determination. The sun sensor on the spinning spacecraft also has multiple detectors for providing an elevation angle relative to a spin intensity bit map profile for indicating the spinning phase and the sun elevation angle. The scanning sun sensor also has a lens for focusing the received sun light onto the sensor. In both the centroid sun sensor and the scanning sun sensor, the received sun light passes directly through a viewing port having a band limited filter, a lens for focusing the light on a detector that may be, as examples, a single pixel, a linear array, a circular array, or a matrix array of photodetectors. These conventional sun sensors are well suited for sun sensing. However, these conventional sun sensors do not sweep the field-of-view for creating a two-dimensional bit map of the sky, which may enhance attitude determination with interpolations.

In general, sun sensors should have low-mass, low power usage, and low volume with accurate and wide spatial coverage. For nanosatellite and microsatellite applications, smaller and lower power sun sensors can be made using advanced semiconductor processing. Imaging systems have used readout chips with photodiode detectors to collect received light and to channelize bit image information. These imaging systems have also used discrete lenses for focusing the image onto the photodetectors. These imaging systems, such as a imaging camera, have a CMOS active pixel array upon which is focused the received light. The availability of submicron CMOS technology, the maturity of CMOS fabrication methods, and the advent of low noise active pixel sensors have enabled high performance CMOS digital imager developments. The primary advantages of a CMOS based design are random access, lower power usage, digital interfacing, simplicity of operation using a single CMOS compatible power supply, high speed, miniaturization through system integration, on-chip signal processing circuits, and radiation tolerance. However, existing sun sensors are relatively large and consume high power. These and other disadvantages are solved or reduced using the invention.

SUMMARY OF THE INVENTION

An object of the invention is to provide a compact sun sensor.

Another object of the invention is to provide a compact sun sensor in a sealed package.

Yet another object of the invention is to provide a compact sun sensor having a microlens for focusing collected sun light.

Still another object of the invention is to provide a compact sun sensor having a microlens for focusing collected sun light in a sensor housing having a reflective surface for folding an optical path onto an array of photosensitive diodes such as a pixelized array.

Still a further object of the invention is to provide a compact sun sensor having a microlens for focusing collected sun light in a sensor housing having a reflective surface for folding an optical path onto an array of photosensitive diodes as part of a readout chip for providing a bit image of the received sunlight.

The invention is directed to an integrated microelectromechanical system (MEMS) sun sensor having a microlens, a folded optical element, and an active pixel sensor array. When used in spinning spacecraft, the scanning sun sensor scans the sky during the rotation of the spacecraft to sweep out a two-dimensional intensity bitmap image of the sky. This image is divided into pixels in azimuth and elevation over the sensor field-of-view during one revolution of the spacecraft. This two-dimensional bit map offers additional information for accurately interpolating the position of the sun through data processing.

The advantages of this MEMS sun sensor includes lower power usage, smaller size, higher performance, and compatibility with planar semiconductor fabrication techniques. The sun sensor can be integrated as an ultra low power CMOS device with an on-board processor in a radiation tolerant hermetic package. Preferably, the MEMS sun sensor is micro-optical element used to form an image of the sun on the active pixel linear array formed by silicon micromachining MEMS techniques. The imaging pixels of the pixel array are formed in the integrated readout circuit. Folded optics are combined with analog and digital readout circuitry formed in an integrated circuit substrate. An integrated microcontroller provides sun sensor data processing and control, and spacecraft interfacing for communicating data. The sun sensor uses low power, has low-mass and low volume by integrating together the readout chip and the data processor chip as a critical spacecraft subsystem for effective use in nanosatellites and microsatellites, where spacecraft resources are at a premium. The power, weight and size savings of resources enable the use of multiple and redundant fault-tolerant sun sensor implementations on large spacecraft where more resources are available. The sun sensor is preferably fabricated using commercial CMOS processes and batch fabrication methods that benefit from mass production for reducing manufacturing costs. These and other advantages will become more apparent from the following detailed description of the preferred embodiment.

BRIEF DESCRIPTION OF THE DRAWINGS

FIG. 1A is a top view of the MEMS Sun Sensor.

FIG. 1B is a side view of the MEMS Sun Sensor.

DETAILED DESCRIPTION OF THE PREFERRED EMBODIMENT

Figure 2:
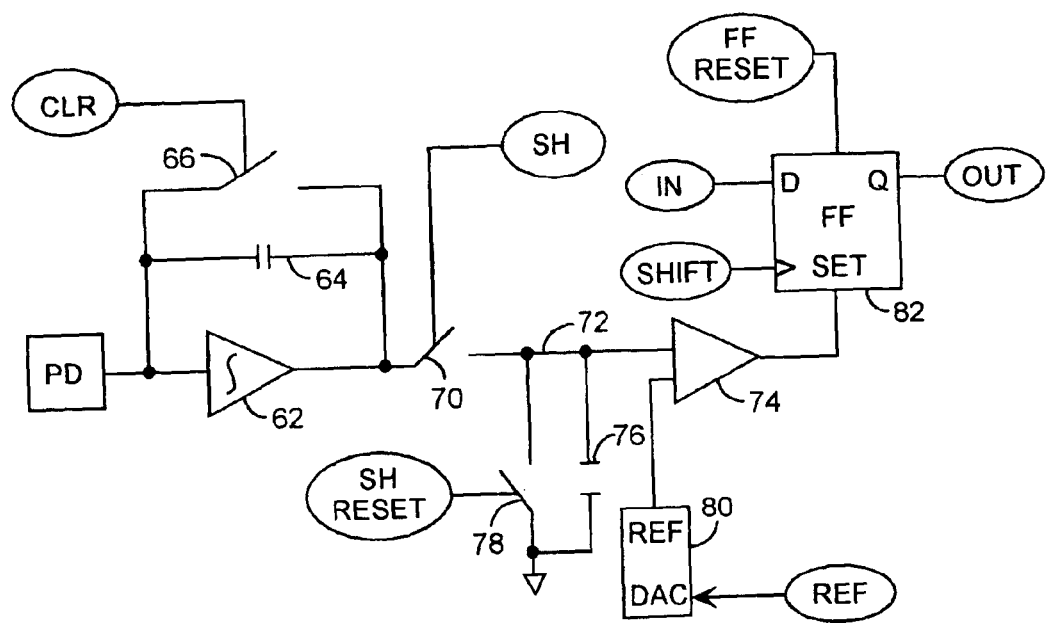
FIG. 2 is a schematic of an active pixel readout channel.

An embodiment of the invention is described with reference to the figures using reference designations as shown in the figures. Referring to FIGS. 1A and 1B, an integrated microelectro-mechanical system (MEMS) sun sensor is packaged using a ceramic package substrate 10 and a ceramic package lid 12 for forming a ceramic package cavity 14 that is hermetically sealed. The substrate 10 and lid 12 form a sun sensor package that can be mounted on a spinning spacecraft. The sun sensor package includes a front-end optical bandpass filter 16 disposed in a sun sensor viewing aperture 18 within the ceramic substrate 10. The filter 16 is an optically neutral density and band limiting filter.

A sun sensor data processor chip 20 is an integrated chip packaged with a sun sensor readout integrated chip 22. The readout chip 22 and the data processor chip 20 are bonded to the substrate 10 within the cavity 14. Sun sensor folded optics 24 are disposed on the sun sensor readout chip 22 that is bonded to the substrate. Conventional wire bonding techniques are used to interconnect the readout chip 22 to the processor chip 20, and used for package external connections. For example, the processor chip 20 includes bonding pads, such as pad 28, with wires, such as wire 30, for connecting the processor chip 20 to the package having boding pads, such as ceramic package pad 32 that is extended as an interconnection package pin. The readout chip 22 also has bonding pads, such as pad 34, and bonding wires, such as wire 36, that are used for example to interconnect the readout chip 22 to the processor chip 20. The readout chip 22 and processor chip 20 are placed in the hermetically sealed ceramic package consisting of the substrate 10 and lid 12.

The folded optics 24 include a microlens 38 that is formed on a sun sensor microlens substrate 40, an optical mask 42 having an optical mask aperture 44, and a MEMS sun sensor housing 46 having a reflective mirror 50. The microlens 38 may have a 4.0 mm focal length. The microlens 38 abuts the optical mask 42 having the optical mask aperture 44 through which passes sunlight within the field of view of the viewing aperture 18 into the housing 46. The optical mask aperture 44 may be 200.0 um in diameter. The microlens 38 is used to fill the entrance aperture diameter and shorten the overall focal length, that may be 4.0 mm, while maintaining the desired sun image spot size, that may be 50.0 um. The optical neutral density and band limiting filter 16 attenuates the intensity of collected solar light and filters received photons to a wavelength of 600.0 nm for reducing diffraction. With a 200.0 um aperture 44 and a 600.0 nm band limiting filter 16, the diffraction limited spot size is less than 36.0 um in diameter at the focal plane.

A microlens assembly may consist of the microlens 38, the sun sensor microlens substrate 40, the optical mask 42 having the optical mask aperture 44. The microlens assembly 38, 40, 42 and 44 is supported in the folded optics MEMS sun sensor housing 46 having housing baffles 48 and a folded optics mirror 50. Sun light passes along a sun light path 52 defining the field of view into a housing optics recess 54 in which is disposed the microlens 38 and the microlens substrate 40. The focused received sun light passes through the optical mask aperture 44 into and through a folded optical cavity 56 within the folded optics housing 46 to then be reflected by the optical mirror 50 to illuminate a linear pixel array 58 of the read out chip 22. The microlens 38 and the reflective mirror 50 create a 36.0 um spot size image of the sun on the linear pixel array 58 that may include N active pixels, for example 340 pixels, that may be aligned in N rows, for example a single row. The reflection of the sun light by the mirror 50 effectively folds the sun light path 52 down on to the linear pixel array 58 that may be made of optically sensitive pixelized photodiodes.

Micromachined microlens technology is used to fabricate the microlens 38 in a sequence of masking steps, each followed by successive Argon ion beam milling operations, to create a course lens profile of desired geometry. Subsequently, high temperature annealing is performed in an inert gas to cause mass transport smoothing of the microlens surface. Accurately shaped apertures greater than 300.0 um may be created in this manner. The compact, planar, optical design of the sun sensor formed by using microlenses and MEMS technology, enables miniature folded optics and sensing within a single semiconductor package 10 and 12. The MEMS optical housing 24 provides a rigid mount for the microlens 38, folding mirror 50, and housing baffles 48 for the absorption of scattered photons. The housing 24 provides enclosed contamination protection of the optical cavity 56.

The sun sensor housing 46 is fabricated from a single crystal silicon substrate in order to provide a stress free match to the silicon wafer of the readout chip 22 over a wide range of temperatures, for example, between −50 C. to +80 C., which can be expected near exterior surfaces of a spacecraft. The internal baffles 48 formed on interior surfaces of the silicon sensor housing 24 can be microtextured to absorb visible-to-near infrared light with high efficiency of greater than 96% for eliminating the need for extra internal antireflective surface coatings, which may otherwise out-gas and contaminate other optical surfaces within the sealed cavity. Antireflective black silicon interior surfaces of the housing 46 can be fabricated using reactive ion etching (RIE) or pulsed laser irradiation of silicon surfaces in a halogen atmosphere.

The housing 46 is formed by micromachining a three-dimensional block of silicon using a combination of anisotropic etching and laser micromachining. Anisotropic etching using liquid KOH solution produces an inverted pyramidal pit with the (111) side walls at a 54.7° angle with the surface. Bulk anisotropic etching is used to fabricate the gross internal housing cavity 56 of the sun sensor with one angled wall use to form the folding reflective mirror 50. This reflective mirror 50, that is, the angled wall, of the housing 46 forming an enclosing surface of the housing cavity 56, can be left uncoated with the etched silicon reflective received light, or can be coated with a thin layer of metal for improving the reflectivity of the angled wall. Fine features of the housing 46, such as the recess 54 and light baffles 48 can be created using laser micromachining. A laser assisted chemical etcher can be computer controlled for three-dimensional cutting for removing silicon at rates of about 50,000 cubic microns per minute. The final microstructuring of the surface to black silicon is performed using either laser processing or RIE to produce black silicon baffles 48.

The microlens 38 fills the entrance aperture diameter 44, shortens the overall optical length, while maintaining angular precision. The optical neutral density and band limiting filter 16 is added to reduced the solar intensity and to limit the accepted photons to a wavelength of 600 nm. This filter 16 prevents saturation of the pixelized photodiodes during an imaging integration interval and reduces diffraction at the focal plane. The sun sensor can be aligned and calibrated with standard HeNe laser sources. With intensity thresholding, the folding optics create an image that can be kept below a 50.0 um spot size. The microlens 38 focuses and passes abundant sunlight to the detector 58 with limited diffraction due to the miniature aperture 44. With a 200.00 um aperture 44 and a 600.0 nm band limiting filter 16, the calculated Airy pattern is 18.0 um.

Referring to FIGS. 1A, 1B, and 2, and particularly to FIG. 2, an active pixel readout channel is used to process a photodiode signal PD from a respective optically sensitive pixel photodiode. The array 58 may be formed using CMOS photodiodes. The photodiodes may be reversed biased photodiodes that convert sun light photons into electron charges as the photodiode signal PD. An integration amplifier 62 using an integration capacitor 64 and an integration switch 66 integrates photodiode current PD for creating an integration voltage at the output of the integration amplifier 62. The integration switch 66 is closed as controlled by a clear signal CLR defining an end of an integration period. Closing the integration switch 66 resets the integration amplifier 62, and opening the integration switch 62 begins the integration period. At the end of an integration period, the integration switch 66 is held open and a sample and hold switch 70 is closed for transferring the integration output voltage onto a sample and hold capacitor 76 through line 72 that is connected to a comparator 74, and onto a sample and hold reset switch 78 while the sample and hold reset switch 78 is held open. The transfer switch 70 is opened to hold the voltage on the sample and hold capacitor 76. The clear switch 66 is then closed and then opened to reset the integration amplifier 62 to being another image integration cycle. The capacitor 76 holds the prior integration voltage until the sample and hold reset switch 78 is closed. The sampled integration voltage is compared by the comparator 74 to a reference provided by a digital to analog converter (DAC) 80, to determine the presence of integrated photons when the comparator output equals a one bit, or to determine the absence of integrated photons when the comparator equals a zero bit. The output of the comparator 74 sets the flip flop 82 when high indicating the presence of the sun in the field of view for those illuminated photodiodes in the array 58. The output of the comparator 74 is low when the sun is not in the field of view. The holding register flip flop 82 maintains a low output from a prior FF RESET initialization. The comparator 74 sets the flip flop 82 in the presence of the sun. The flip flop 82 also has an IN input and a SHIFT input to the flip flop 82 for shifting data through the flip flop 82 during a digital bit stream read-out of the photodiode array 58. These digital read-outs occur such that the prior comparator results of an image integration period are read-out during the current image integration cycle.

Figure 3:
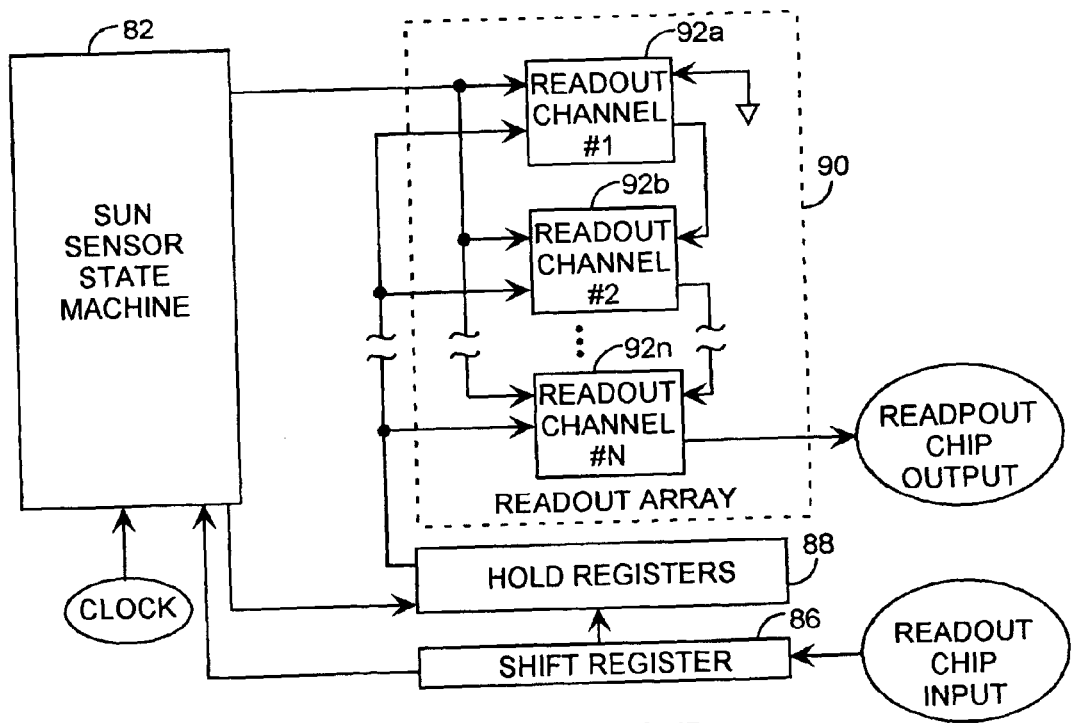
FIG. 3 is a block diagram of an active pixel readout chip.

Referring to FIGS. 1A, 1B, 2 and 3, and particularly to FIG. 3, the active pixel readout chip 22 includes a sun sensor state machine 82, input shift registers 86, holding registers 88 and a readout array 90. The readout array 90 includes daisy chain connected active pixels readout channels 92a, 92b, through 92n. The output of one flip flop 82 of one readout array channel, such as channel 92a is connected to the D input of another flip flop in another readout channel, such as channel 92b, in the chain of flip flops 82 of the chain readout channels, 92a through 92n. The SHIFT signal is used to shift the bits of all of the flip flops 82 effectively forming a serial shift register. The plurality of readout channels 92a through 92n are connected in series for forming the shift register. This shift register made of the flip flops 82 of the readout channels 92a through 9n, shifts the linear bit map through the readout chip output to the data processor 20. The state machine 82 controls the shifting of the linear bit map image. As a scanning sun sensor, on a spinning spacecraft, the sensor field-of-view sweeps the sky, successively shifting out azimuthal segments of the sky as individual linear bit map images ultimately providing a composite two dimensional image reference. This composite image is composed of azimuthal sun angle information, provided by each successive serial digital read-out and solar elevation angle information imaged during the presence or absence of the sun in each pixel of the read-out bit stream. This information is referenced to the spin phase of the spinning spacecraft and is well suited for solar attitude determinations in spinning spacecraft.

The readout chip input includes the DAC 80 having reference REF data for each of the active pixels, and hence, for each of the DACs 80 for normalizing the response of all the active pixels of the array 58 so that all of the active pixels of the array 58 provide the same level of detection sensitivity and rejection of background light sources. The shift register 86 indicates to the state machine 82 when new data has been received, including new DAC REF reference data. The shift register 86 holds a DAC value for a respective one of the channels 92a through 92n. The DAC value is then stored in one of the hold registers 88, and communicated to a respective DACs 80. The next received DAC value is shifted in the shift register 86 and then again loaded into another one of the hold registers 82 and again communicated to another respective one of the DACs 80. Each of the hold registers 88 will be loaded in turn with all the DAC values of the DACs 80 for all of the channels 92a through 92n. The state machine 82 is used to control the operation of the storing the DAC reference values in the hold registers 88 and for shifting out the bit map through the readout chip output as well as controlling, clearing and setting the integration switch 66, the sample and hold switch 70, and sample and hold reset switch 78, and the flip flop 82 FF Reset and Shift controls for synchronized detection of the sun image and for serial readout of the image bit map.

Figure 4:
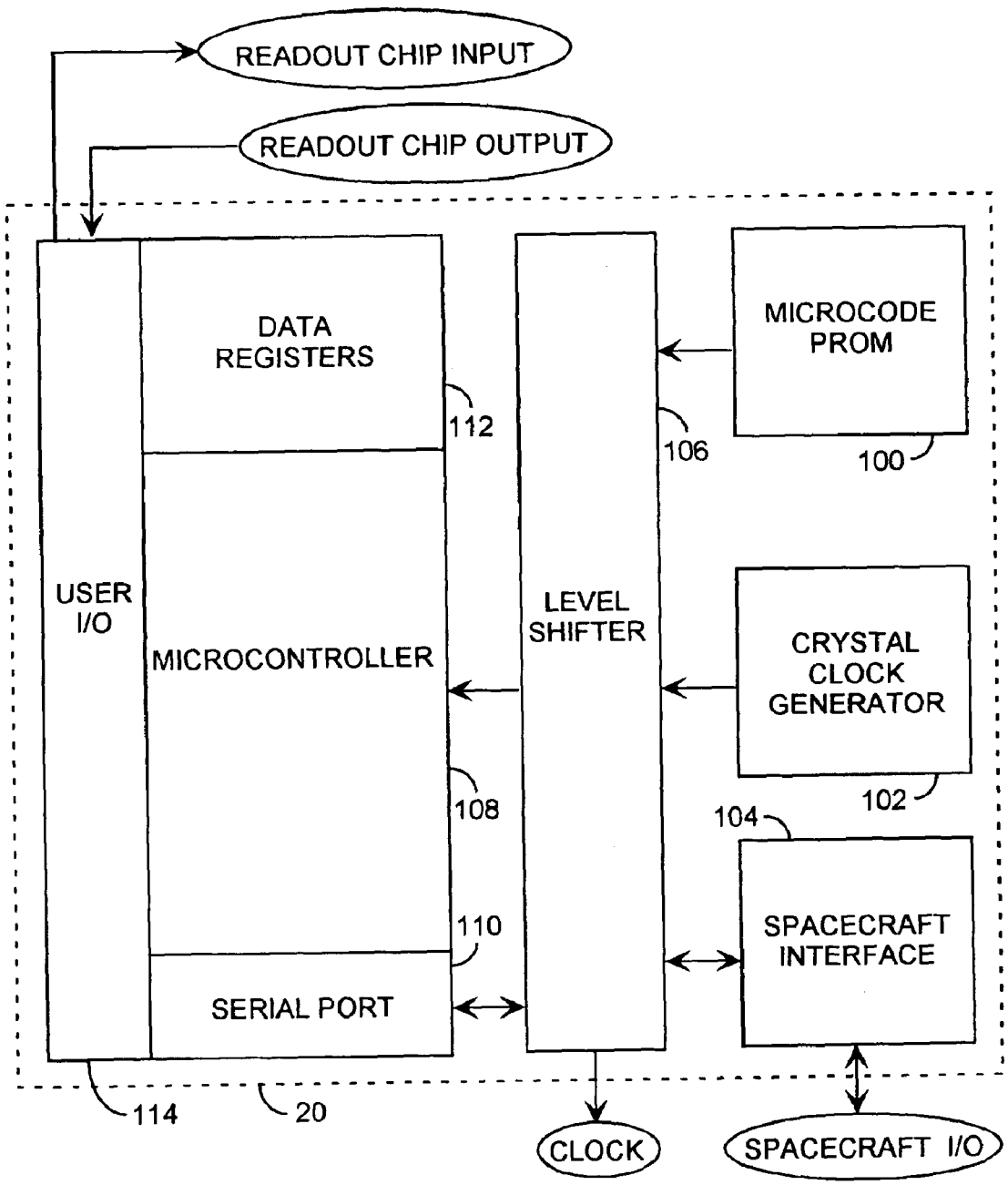
FIG. 4 is a block diagram of the MEMS Sun Sensor data processor.

Referring to all of the Figures, and particularly to FIG. 4, the sun sensor data processor 20 includes a microcode PROM 100 and a crystal clock generator 102. Interface circuits, such as a spacecraft interface 104 are used for transceiving spacecraft I/O signals. A level shifter 106, including a clock signal for operation with a convientrional microcontroller 108 that may further be integrated with a serial port 110, data registers 112, and user I/O 114 for communication to the readout chip inputs and outputs. The readout chip 22 and processor chip 20 require power lines, ground lines, address pins, a clock input and bidirectional serial data bus connections for spacecraft I/O to a spacecraft through the spacecraft interface 104. The microcontroller 108 may be for example a conventional 8051 microcontroller implementing the command, control, calibration, and sun centroid interpolation algorithms on the raw bit map data provided by the readout chip 22. Focal plane data processing is provided by the data processor 20 having a conventional 8051 microcontroller 108. The 8051 microcontroller 108 is an 8-bit embedded controller. The 8051 microcontroller 108 can access program instructions from the PROM and provides interface control for serial communications as well as a necessary system interval timer. The data processor 20 also contains voltage level shifting 106 required to interface to the readout chip 22 as well as to communicate with the spacecraft systems through the spacecraft interface 104. With a power supply operating the microcontroller in an ultra low power mode at 0.5 volts, the total required power may be approximately 4.0 mW when operating at 4.0 MHz.

The microcode PROM 100 stores computer programs for communicating the bit map to the microcontroller 108 from the readout chip 20, for setting the comparator DAC calibration values in the readout chip 20, and for performing an algorithmic determination of the spin phase synchronized solar azimuth and elevation angles. The data processor 20 reads the readout chip outputs, stores bit map slices, and interpolates the position of the sun by providing the sun elevation angle and sun azimuth angle to the spacecraft. The serial port 110 is used for communications to the spacecraft through the level shifters 106 and the spacecraft interface 104. Communications from the data processor 20 to the readout chip 22 is through the programmed user I/O for serial communication with the readout chip 22. The communications to the readout chip 20 includes DAC reference calibration information. The shift register 86 can also be used for communicating adaptive control data to the sun sensor state machine 82. The data registers 112 are used as scratch pad memory during execution of the microcode of the PROM 100 for calculating the spin phase synchronized azimuth and elevation angles of the sun.

Multiple sun sensors, such as three sun sensor packages, may be mounted with 1.0° overlap between sensor package Fields-of-View, (FOV), resulting in an overall 100°×0.1° full angle FOV. The microcontroller 108 has serial packet protocol interface as part of the processor chip 20 that communicates calibrated individual sun sensor azimuth and elevation angle information directly to the spacecraft data handling system. Due to the simplicity of interconnecting multiple sun sensor chips in a serial daisy chain manner, in principle more sun sensor chips may be arrayed and addressed either to improve spatial resolution, or to improve spatial coverage, or to improve reliability through redundancy. For example, six packages could be arrayed with individual offset angles to create a 180°×0.1° FOV sun sensor. The sun sensor may have a sun centroid accuracy of 0.5°+/−0.1° with a FOV of greater than 180° elevation×360° azimuth at spin rate between one RPM and 100.0 RPM, with power of less than 100.0 mW, with a mass of 30 gm, a volume of 10.0 cc, and a DC power supply of 3.3 V.

The sun sensor configuration is compact with suitable pixel readout rates for creating continuous scan images. The sun sensor is preferably used on a spinning spacecraft so that the sun sensor sweeps out the entire sky each revolution. For spin periods between one RPM and a hundred RPM, the maximum 0.1° integration period will range from 16.7 ms to 167.0 us respectively. For detecting light at 600.0 nm light and 800.0 nm light, 10 um$^2$ detectors, with 600.0 nm filter, the maximum integrated number of electrons at the detector output will range from $2.75 \times 10^{10}$ to $2.75 \times 10^8$ for 1 RPM and 100 RPM integration periods respectively. In practice, these signal values are large to allow integration for a fixed 100.0 us period, accumulating greater than $1 \times 10^8$ electrons, for variable spin periods between one RPM and 100.0 RPM. At spin rates over 100.0 RPM however, the data processor 20 will limit the throughput to one set of angular determinations per ten spins. Accuracy of the sun sensor is determined by the optical performance and interpolation algorithm used to process raw sun image data. Five pixels are used to image the entire solar disk, from low earth orbit. This raw image data is then used as an input to a centroid algorithm to determine the location of the sun in 0.5° increments of azimuth and elevation with +/−0.1 degree accuracy. Each MEMS sun sensor package has a 34°×0.1° FOV. Multiples sun sensors can be used to cover a particular FOV requirement. For an exemplar requirement of greater than 100° FOV, three sun sensing elements are used to form a composite sun sensor with slight overlaps of the respective FOVs creating a sensor with 100.5°×0.1° FOV. As the spacecraft rotates, successive slices of the sky are imaged, providing a complete FOV of 100.5°×360° for each spacecraft revolution. Also, stacks of sun sensors may be arrayed to form staring arrays for spacecraft that are three-axis stabilized. Each sun sensor package may provide a 34°×0.1° FOV. For example, a staring sun sensor application with a required 34°×3.4° FOV would require a stacked array of thirty-four individual sun sensors with 0.1° rotational offsets to provide the required FOV.

The operation of the sun sensor is based on a miniature scanning sensor array. The sun sensor relies on rotation of a spinning spacecraft to sweep out a bitmap image of the sky. The image is divided into 0.1° pixels in azimuth and elevation over the sensor FOV during one revolution of the spacecraft. A microcontroller sequences focal plane operations and performs a sun centroid algorithm on the acquired raw bitmap data to report the location of the sun in 0.5° azimuth and elevation steps with +/−0.1° accuracy. The sun sensor has lower mass, lower power usage, and lower volume with suitable accuracy and spatial coverage than prior art. The sun sensor can be used as part of a critical spacecraft subsystem used effectively in nanosatellites and microsatellites, where spacecraft resources are at a premium.

The analog and digital circuitry of the readout chip 22 may use a 0.5 um radiation tolerant commercial process, while data processor digital circuitry 20 may use a 0.35 um radiation tolerant process to mitigate space radiation effects. These processes provide a sun sensor that is insensitive to a total ionizing dose and single event effects found in the near earth space environment. The sun sensor may also be used to provide redundant fault-tolerant sun sensors in implementations on large spacecraft where more resources are available. Placement of individual sun sensor packages in linear arrays, stacks and/or artful decoration of a host spacecraft can provide enhanced reliability, improved spatial resolution and improved spatial coverage of the sun sensor in a particular application. Those skilled in the art can make enhancements, improvements, and modifications to the invention, and these enhancements, improvements, and modifications may nonetheless fall within the spirit and scope of the following claims.

What is claimed is:

1. A sensor for generating a bit image of a viewed image received through a field of view, the sensor comprising, a sealed package, a viewing port within the package for receiving the viewed image of the field of view, a sensor housing defining a housing cavity and providing a reflective surface, a microlens disposed in the housing for focusing the viewed image into a focused image that illuminates the reflective surface for providing a reflective image, an aperture for communicating the focused image into the housing cavity and onto the reflective surface, and a readout chip comprising a pixel array of photodiodes for receiving the reflective image and providing the bit image as a readout channel.

2. The sensor of claim 1 wherein, the sensor housing is a self-enclosing optical cavity that prevents contamination from obstructing sun light passing through the aperture and reflecting off the reflective mirror and illuminating the photodiodes.

3. The sensor of claim 1 wherein, the pixel array is disposed in a readout chip for communicating the bit map image.

4. The sensor of claim 1 wherein, the pixel array is an active CMOS active pixel array, and the bit map image is an azimuthal bit map image.

5. The sensor of claim 1 further comprising, a bandpass filter disposed in the viewing port for band limiting the received image for reducing diffraction.

6. The sensor of claim 1 further comprising, a bandpass filter disposed in the viewing port to be reduced solar intensity and for band limiting the received image for reducing diffraction.

7. The sensor of claim 1 wherein, the aperture is 200 um for creating a spot size of less than 36 um.

8. The sensor of claim 1 wherein, the aperture is 200 um for creating a diffraction limited spot size of less than 36 um at a focal plane.

9. The sensor of claim 1 further comprising, a data processor for receiving the bit map through the readout channel for generating a bit map image.

10. The sensor of claim 1 further comprising, a data processor for receiving the bit map image through the readout channel for generating a bit map image and a spin phase synchronized solar azimuthal angle and a solar elevation angle, the bit map image referenced to the solar azimuth angle and the solar elevation angle.

11. The sensor of claim 1 further comprising,
a data processor for receiving the bit map through the readout channel for generated a bit map image for communication to an image processor.

12. The sensor of claim 1 wherein the housing cavity has baffles for reducing light scattering within the housing cavity.

13. The sensor of claim 1 wherein the housing cavity has microtextured baffles for reducing light scattering within the housing cavity.

14. The sensor of claim 1 further comprising,
a bandpass filter disposed in the viewing port for 600 um band limiting the received image for reducing diffraction, the aperture is 200 um for creating a spot size of less of 36 um.

15. The sensor of claim 1 wherein,
the microlens focuses a viewed image into a focused image having a sun image spot size of 50 um that illuminates the reflective surface.

16. The sensor of claim 1 wherein,
the reflective surface provides a folded optical path.

17. The sensor of claim 1 wherein,
the reflective surface provides a folded optical path to reduce in volume the housing cavity volume and planarize the sensor.

* * * * *